United States Patent [19]

Hornsby

[11] Patent Number: 5,275,421
[45] Date of Patent: Jan. 4, 1994

[54] MECHANICAL SEAL STUD TORQUING SYSTEM

[76] Inventor: John Hornsby, 5143 Sandy Ridge Dr., Baton Rouge, La. 70817

[21] Appl. No.: 928,150

[22] Filed: Aug. 7, 1992

Related U.S. Application Data

[63] Continuation of Ser. No. 674,512, Mar. 22, 1991, abandoned.

[51] Int. Cl.⁵ .............................................. F16J 15/34
[52] U.S. Cl. ........................................ 277/9; 277/81 R; 277/136
[58] Field of Search ............... 277/8, 9, 9.5, 11, 38, 277/81, 136

[56] References Cited

U.S. PATENT DOCUMENTS

| | | | |
|---|---|---|---|
| 2,094,160 | 9/1937 | Oldberg | 277/81 R X |
| 3,116,066 | 12/1963 | Koppius | 277/81 R X |
| 3,970,320 | 7/1976 | Wiese | 277/81 R X |
| 4,095,803 | 6/1978 | Meir et al. | 277/136 X |
| 4,389,051 | 6/1983 | Mullaney | 277/81 R X |
| 4,625,977 | 12/1986 | Azibert et al. | 277/9 X |
| 4,786,061 | 11/1988 | Buchalla | 277/81 R |
| 4,989,882 | 2/1991 | Warner et al. | 277/11 |
| 5,039,115 | 8/1991 | Hebert et al. | 277/136 |

*Primary Examiner*—Thomas B. Will
*Assistant Examiner*—Scott W. Cummings
*Attorney, Agent, or Firm*—Robert C. Tucker; William David Kiesel

[57] ABSTRACT

An improved cartridge mounted mechanical seal for providing a seal between a housing and a rotatable shaft is provided, including at least one radial stud which extends from the inside of the rotary sleeve of the seal through the rotary sleeve and into the lock collar of the seal so as to transmit torque from the shaft to the rotating face of the seal.

4 Claims, 2 Drawing Sheets

MECHANICAL SEAL STUD TORQUING SYSTEM

This application is a continuation of application Ser. No. 07/674,512 filed on Mar. 22, 1991 now abandoned.

BACKGROUND OF THE INVENTION

1. Field of the Invention.

This invention relates generally to mechanical seals and, more specifically to cartridge mounted mechanical seals which.

2. Prior Art.

Mechanical seals are used to provide a seal between various components on a rotating shaft. Such seals take many different forms. In the field of cartridge mounted seals are mechanical seals which have at least one set of contacting seal faces, one rotary face and one stationary face, the rotary face being driven by its connection to a sleeve which is mounted nonrotatably to the shaft. The entire cartridge seal unit is installed by simply sliding the sleeve and the attached seal components onto the shaft and fixing the sleeve in place. A gland plate is provided for supporting the stationary seal face. The gland plate is usually bolted to the housing (such as a pump housing) through which the shaft extends.

Cartridge mounted mechanical seals are shipped and installed as a unit. The rotary sleeve of the seal and the lock collar of prior art seals are held in place during shipment by temporary clips or cams, which work in conjunction with set screws which are threaded through holes in the lock collar and the sleeve. A typical arrangement is shown in FIGS. 3 and 4. Cup point set screws 60 extend through lock collar 61 and sleeve 62. Upon installation, cup point set screws 60 dig into shaft 63, setting the seal in position. Although some seals have only cup point set screws to both set and drive the seal, this is not desirable. As shown in FIGS. 3 and 4, dog point set screws 64 having a blunt end are installed through holes in the lock collar 61 and the sleeve 62. The hole in sleeve 62 matingly receives the end of dog point screw 64. Thus, the lock collar 61 receives torque from the cup point set screws 60 and drives the sleeve 62 via the dog point screws 64, protecting the cup point screws 60 and threads from excessive wear. Dog point screws 64 also provide a means for maintaining axial alignment of seal parts during shipment.

While the dog point set screws 64 solve the problem of excessive wear of the cup point screws 60 as well as maintain axial alignment, several other problems present themselves. It is difficult to determine from the exterior of the lock collar 61 which screws are which, resulting in accidental loosening or tightening of the wrong screws. For example, a dog point screw 64 may be overtightened to the point where the blunt end of the screw abuts the shaft, causing the lock collar 61 and/or the sleeve 62 to bend. Further, during rotation of shaft 63 dog point screws 64 may back out of their holes causing excessive torque to be transmitted to cup point screws 60, galling threads and damaging the seal. Also, should dog point screws 64 be mistakenly removed or loosened during shipment, axial misalignment of the seal can result.

SUMMARY OF THE INVENTION

Accordingly, it is an object of this invention to provide a cartridge mounted mechanical seal with a means for transferring torque from a shaft to the rotary components of the seal without damaging fastener components, such as cup point set screws.

It is another object of this invention to provide a means for transferring torque from a shaft to the rotary components of the seal which maintains axial alignment of the seal prior to installation and during operation.

It is still another object of this invention to provide a means for transferring torque from a shaft to the rotary components of the seal which will not become disengaged during seal operation.

Therefore, an improved cartridge mounted mechanical seal for providing a seal between a housing and a rotatable shaft is provided, including at least one radial stud which extends from the inside of the rotary sleeve of the seal through the rotary sleeve and into the lock collar of the seal so as to transmit torque from the shaft to the rotating face of the seal.

DETAILED DESCRIPTION OF PREFERRED EMBODIMENTS OF THE INVENTION

Figures 1, 2:
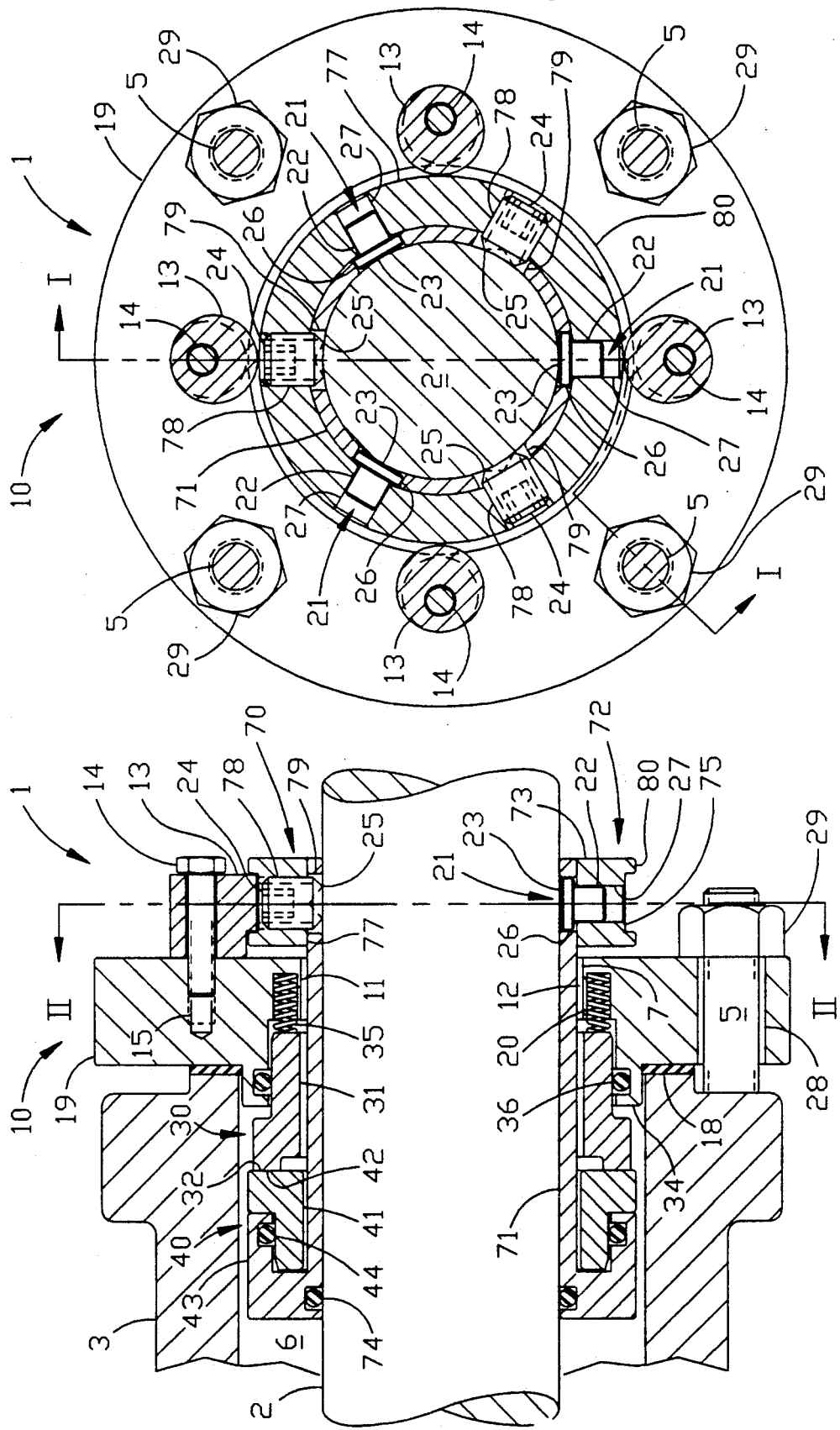
FIG. 1 is a sectional side view of an embodiment of the invention taken along section line I—I of FIG. 2.
FIG. 2 is a sectional end view of an embodiment of the invention taken along section line II—II of FIG. 1.
Figure 4:
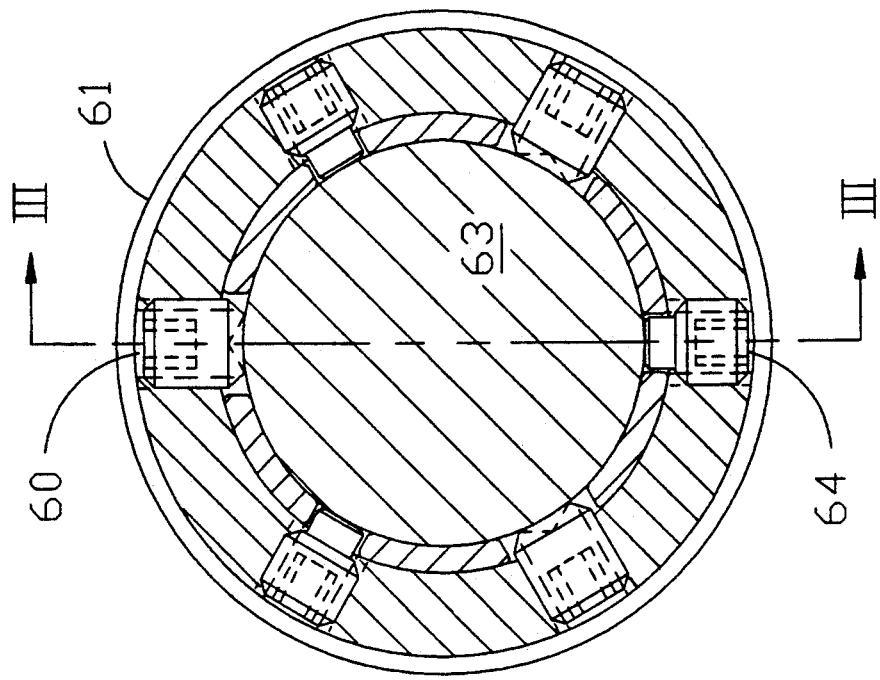
FIG. 4 is a sectional end view of a prior art mechanical seal taken along section line IV—IV of FIG. 3.
Figure 3:
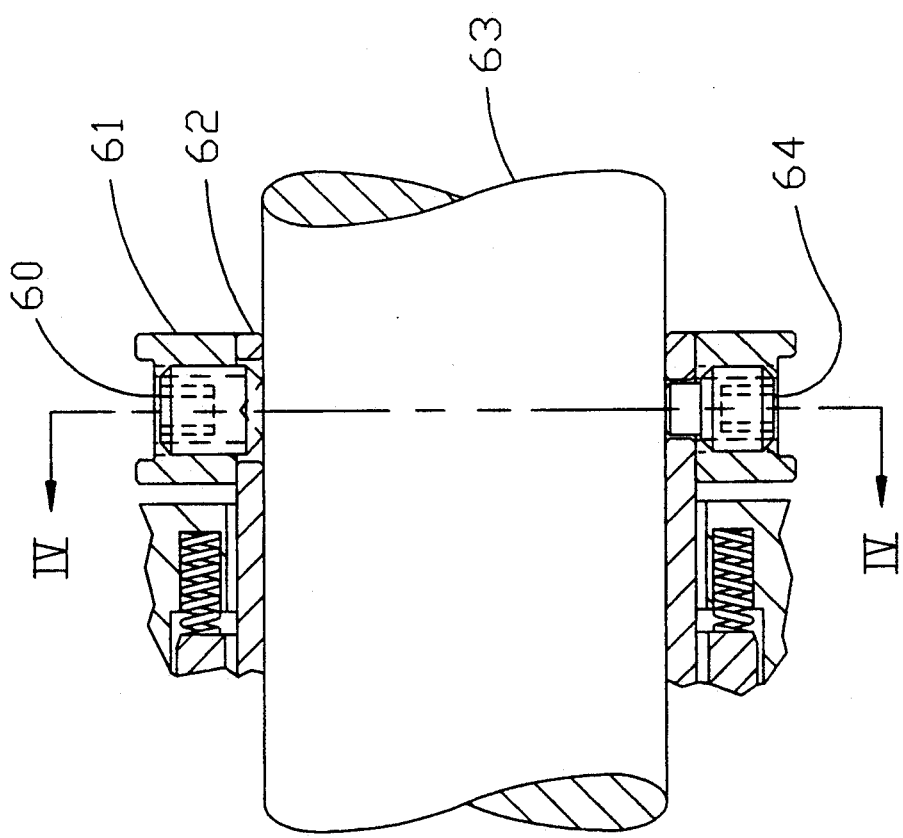
FIG. 3 is a sectional side view of a prior art mechanical seal taken along section line III—III of FIG. 4.

As shown in FIGS. 1 and 2, the mechanical seal 1 of the invention provides a seal around a rotatable shaft 2 within a housing 3. The seal 1 is attached to housing 3 via gland studs 5, and is attached to shaft 2 utilizing threaded fasteners 24 having sharp contact ends 25, such as cup point set screws, which attach rotary sleeve assembly 70 to shaft 2. The seal 1 shown in the Figures will operate as a single seal. It should be understood that the stud torquing system described herein will function equally well in applications requiring a double or tandem seal. The following discussion will center around a single seal application, but in no way is intended to limit the scope of the invention to such applications.

The seal 1 includes a gland means 10, such as a gland plate 19 or other constructions known in the art, which is nonrotatably attachable to housing 3 in a surrounding relationship to shaft 3. Shaft 3 as well as rotary sleeve 71 pass through an opening 7 in gland plate 19. An annular inner flange 11 is provided on gland plate 19, extending inward toward shaft 2. Inner flange 11 forms an annular space 12 around shaft 2. Gland plate 19 is fixed to housing 3 with gland studs 5 extending through gland stud holes 28 and secured by gland stud nuts 29. Gasket 18 provides a seal between housing 3 and gland plate 19.

Annular stationary seal means 30 is positionable around shaft 2, axially adjacent to inner flange 11 and in a nonrotatable relationship with respect to housing 3. Inner flange 11 supports annular stationary seal means 30 via spring holes 20, bored partially into inner flange 11. Springs 35 are seated in spring holes 20. Springs 35 bear against stationary seal means 30, which includes stationary seal member holder flange 34, stationary seal member 31 having a stationary seal face 32. Springs 35 provide a means for self-adjustment of stationary seal face 32, compensating for misalignment during installation of the seal 1. 0-ring 36 provides a seal between inboard stationary seal holder flange 34 and stationary seal member 31.

Annular rotary seal means 40 is nonrotatably connected to rotary sleeve assembly 70, which is nonrotatably attachable around shaft 2. As shown in FIG. 1, annular rotary seal means 40 includes rotary seal member 41 having a rotary seal face 42, and inboard rotary seal member holder flange 43. Holder flange 43 holds inboard rotary seal member 41 in place on rotary sleeve assembly 70. 0-ring 44 provides a seal between holder flange 43 and inboard rotary seal member 41. Rotary seal face 42 is slidably and sealingly engageable with stationary seal face 32, providing a seal between housing cavity 6 and the exterior of the housing 3.

Rotary sleeve assembly 70 drives the rotary seal face 42 and provides a means for attachment of the seal 1 to the shaft 2. Rotary sleeve assembly 70 also provides a means for holding the various parts of the seal together as a unit, or cartridge, simplifying seal installation and alignment. Rotary sleeve 71 is nonrotatably attached around shaft 2 by threaded fasteners 24. As shown, threaded fasteners 24 pass through radial threaded bore 78 (through outer annular surface 80 and inner annular surface 77 of lock collar 73). Threaded fasteners 24 also pass through fastener bore 79 in rotary sleeve 71. Fastener bore 79, located in the outboard end 72 of sleeve 71, can be slightly larger than threaded bore 78 to allow fastener contact end 25 to penetrate shaft 2 and provide a sound connection thereto. 0-ring 74 provides a seal between sleeve 71 and shaft 2.

In storage and in transit, cam lobes 13 (usually constructed of plastic) fit into cam lobe groove 75 in lock collar 73, holding lock collar 73 in axial alignment. Cam lobes 13 are held in place by cam lobe bolts 14, which are installed in cam lobe bolt holes 15. In installation, sleeve assembly 70, on which is mounted all of the various parts described above, slides onto shaft 2 until gland means 10 abuts housing 3. Gland stud nuts 29 and threaded fasteners 24 are then tightened, the cam lobes 13 are removed, and the seal 1 is ready for operation.

Instead of using prior art dog point set screws 64 or relying totally on threaded fasteners 24 such as cup point set screws, the seal 1 utilizes studs 21 to provide torque to lock collar 73. Studs 21, having shafts 22, are matingly insertable through radial stud bores 26 in sleeve 71 and into radial stud torquing bores 27 in lock collar 77. Radial stud torquing bores 27 extend at least partially into lock collar 77. If studs 21 are not supplied with heads 23, radial stud torquing bores 27 should not extend through to outer annular surface 80 of lock collar 73, in order to prevent rotative forces from urging studs 21 completely through torquing bores 27 during seal operation. Stud 21 should have a length no longer than the total length of radial stud bore 26 plus the length of radial stud torquing bore 27.

Preferably, studs 21 are provided with heads 23. In such case, radial stud bores 26 have diameter greater than that of torquing bores 27, and stud heads 23 are matingly insertable into radial stud bores 26. Stud heads 23 should have a thickness no greater than the thickness of sleeve 71. Thus, during rotation, studs 21 impart torque to lock collar 73, protecting threaded fasteners 24. Torquing bores 27 may be drilled completely through lock collar 73, since stud heads 23 will prevent studs 21 from being ejected through torquing bores 27 by rotative forces.

It is also preferable to install studs 21 prior to seal shipment, in order to maintain proper axial alignment during handling. Studs 21 can be made so as to produce a tight press fit in order to prevent them from falling out during shipment. Preferably, studs 21 should be installed using a small amount of temporary adhesive, such as glue, assuring that they remain in place during shipment.

As can be seen, a stud torquing system is provided which protects threaded fasteners from damage during seal operation, and which maintains alignment during shipping. There are no screws which can be mistakenly tightened or loosened in the manner of dog point set screws. Other embodiments of the invention will occur to those skilled in the art, and are intended to be included within the scope and spirit of the following claims.

I claim:

1. In combination with a mechanical seal for providing a seal between a housing and a rotatable shaft, said mechanical seal including:
   a. a gland means, nonrotatably attachable to said housing in a surrounding relationship to said shaft and having an opening through which said shaft passes;
   b. an annular stationary seal means having a stationary seal face slidably and sealingly engageable with a rotary seal face, said stationary seal means positionable around said shaft axially adjacent to said gland means and in a nonrotatable relationship with respect to said housing;
   c. an annular rotary seal means having a rotary seal face slidably and sealingly engageable with said stationary seal face, said rotary seal means nonrotatably connected to a rotary sleeve; and
   d. a rotary sleee assembly, including a rotary sleeve having an outboard end, said rotary sleeve being nonrotatably attachable around said shaft and extending between said rotary seal face and said shaft, between said stationary seal face and said shaft, and through said opening in said gland means, said outboard end extending outside said gland means, said rotary sleeve assembly further including an annular lock collar fixedly connectable to said shaft in a surrounding relationship to said outboard end of said sleeve, said lock collar having an inner annular surface and an outer annular surface; wherein said lock collar is provided with at least one radial threaded bore through said outer annular surface and said inner annular surface, and said outboard end of said sleeve is provided with a fastener bore alignable with said threaded bore; and
   e. at least one threaded fastener having a contact end, said fastener being threadable through said threaded bore to a point wherein said contact end passes through said fastener bore and contacts said shaft;

an improvement, wherein said sleeve is provided with at least one radial stud bore extending through said sleeve, and said lock collar is provided with at least one radial stud torquing bore, alignable with said radial stud bore and extending through said inner annular surface and at least partially into said lock collar, said mechanical seal further comprising:
   f. at least one radial stud, matingly insertable into said radial stud bore and said radial stud torquing bore, extending radially from within radial stud bore of said rotary sleeve and into said radial stud torquing bore of said lock collar, so as to transmit torque from said shaft and said lock collar to said rotary sleeve and said rotary seal means.

2. A mechanical seal according to claim 1, wherein said radial stud bore has a greater diameter than said radial stud torquing bore, and said radial stud includes a head and a shaft, said head having a thickness no greater than said rotary sleeve and being matingly insertable in said radial stud bore, and said shaft being matingly insertable in said radial stud torquing bore.

3. A mechanical seal according to claim 1, further comprising a temporary adhesvie applied to said stud for holding said stud in place within said radial stud bore and said radial stud torquing bore prior to installation of said seal.

4. A mechanical seal according to claim 2, further comprising a temporary adhesive applied to said stud for holding said stud in place within said radial stud bore and said radial stud torquing bore prior to installation of said seal.

* * * * *